United States Patent [19]

Schiffers

[11] Patent Number: 4,697,415

[45] Date of Patent: Oct. 6, 1987

[54] COMBINED GAS AND STEAM-TURBINE POWER GENERATING STATION

[75] Inventor: Ulrich Schiffers, Eckental, Fed. Rep. of Germany

[73] Assignee: Kraftwerk Union Aktiengesellschaft, Mülheim/Ruhr, Fed. Rep. of Germany

[21] Appl. No.: 893,098

[22] Filed: Aug. 4, 1986

[30] Foreign Application Priority Data

Aug. 5, 1985 [DE] Fed. Rep. of Germany ....... 3528073

[51] Int. Cl.$^4$ .............................................. F02C 3/28
[52] U.S. Cl. ................................. 60/39.12; 60/39.182
[58] Field of Search ............... 60/39.07, 39.12, 39.182; 55/75, 389

[56] References Cited

U.S. PATENT DOCUMENTS

| | | | |
|---|---|---|---|
| 3,989,478 | 11/1976 | Jones | 60/39.12 |
| 4,019,314 | 4/1977 | Springmann | 60/39.12 |
| 4,264,339 | 4/1981 | Jüntgen et al. | 55/75 |
| 4,341,069 | 7/1982 | Bell et al. | 60/39.12 |
| 4,386,945 | 6/1983 | Gardner | 55/389 |
| 4,488,398 | 12/1984 | Noguchi | 60/39.12 |
| 4,576,614 | 3/1986 | Armond | 55/75 |
| 4,608,818 | 9/1986 | Goebel et al. | 60/39.12 |
| 4,631,915 | 12/1986 | Frewer et al. | 60/39.12 |

FOREIGN PATENT DOCUMENTS 0127092 12/1984 European Pat. Off. .
2733029 2/1979 Fed. Rep. of Germany .
3123748 3/1982 Fed. Rep. of Germany .
3319711 12/1984 Fed. Rep. of Germany .
2029855 3/1980 United Kingdom .

Primary Examiner—Louis J. Casaregola
Attorney, Agent, or Firm—Herbert L. Lerner; Laurence A. Greenberg

[57] ABSTRACT

A combined gas and steam-turbine power generating station having a gas-turbine unit and a steam turbine unit, the gas-turbine unit having a gas turbine with a combustion chamber, a coal gasifier preceding the gas turbine unit, a heat exchanger plant including a raw gas/pure gas heat exchanger following the coal gasifier, a gas purifier following the heat exchanger plant, a pure-gas line leading from the gas purifier to the combustion chamber of the gas turbine, an air decomposition plant with a molecular sieve regeneration circuit preceding the coal gasifier and having an oxygen line feeding the coal gasifier and a nitrogen line leading to the combustion chamber of the gas turbine, and a nitrogen compressor connected in the nitrogen line, includes at least one air compressor preceding the air decomposition plant and the combustion chamber of the gas turbine, and an air line connecting the air compressor to an input of the air decomposition plant, the air line being divided into two parallel branches, one of the branches including therein a heat exchanger connected into the molecular sieve regeneration circuit of the air decomposition plant and the other of the branches including therein a nitrogen/air heat exchanger leading to the combustion chamber of the gas turbine.

12 Claims, 1 Drawing Figure

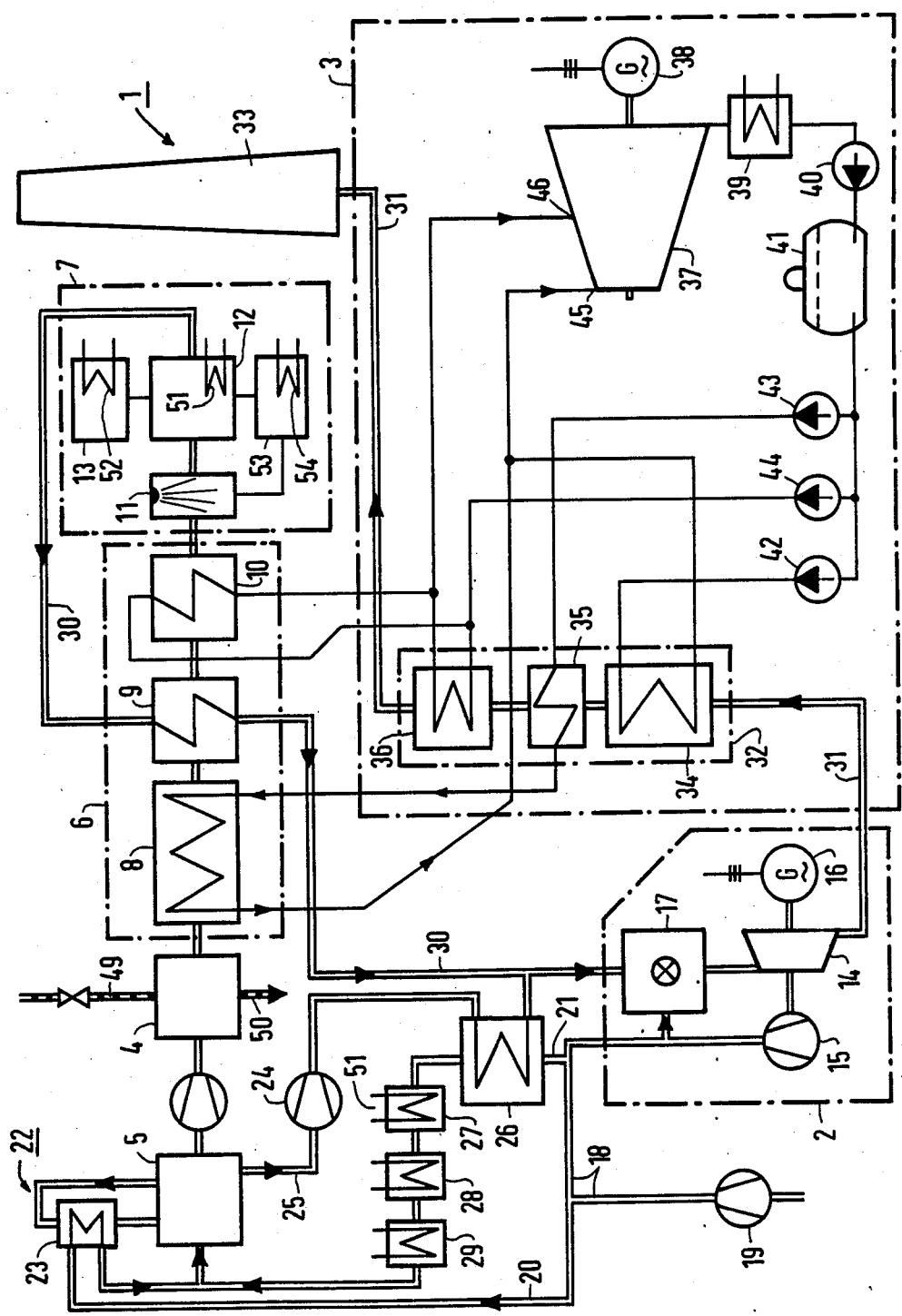

COMBINED GAS AND STEAM-TURBINE POWER GENERATING STATION

The invention relates to a combined gas and steam-turbine power generating station with a coal gasifier preceding the gas turbine unit, a heat exchanger system including a raw gas/pure gas heat exchanger following the coal gasifier, a gas purifier following the heat exchanger system, a pure-gas line leading to the combustion chamber of the gas turbine, an air decomposition facility preceding the coal gasifier and having an oxygen line feeding the coal gasifier and a nitrogen line leading to the combustion chamber of the gas turbine, a nitrogen compressor connected into the nitrogen line, and at least one air compressor preceding the air decomposition system and the combustion chamber of the gas turbine.

Such a combined gas and steam-turbine power generation station is known from German Published Non-prosecuted Application (DE-OS) No. 33 19 711 corresponding to copending U.S. application Ser. No. 814,577. In this combined gas and steam-turbine power generating station, the hot raw gas leaving the coal gasifier is cooled down in a heat exchanger system, which includes a high-pressure steam generator, a raw gas/pure gas heat exchanger and a low-pressure steam generator, before it is fed to a gas purifier. The heat obtained in this process is used in the high-pressure steam generator for generating high-pressure steam; in the raw gas/pure gas heat exchanger for reheating the pure gas flowing from the gas purifier to the combustion chamber of the gas turbine; and in the low-pressure steam generator, for generating low pressure steam. The high-pressure and low-pressure steam thus generated is fed to the steam turbine unit of the power generating station. In addition, further high-pressure steam is generated in this conventional power generation station, in a waste-heat steam generator thereof through which the exhaust gas of the gas turbine flows. It is a particular advantage of such a gas and steam-turbine power generating station that its power output can be varied within broad limits. Even the gas turbine is shut down completely and the steam generation in the waste heat steam generator following the gas turbine ceases, the steam turbine can continue to be operated by means of the steam generated in the heat exchanger system following the coal gasifier, although at reduced power output, so that even in this extreme case, the internal demand for electric power can remain covered via the generator driven by the steam turbine.

It is an object of the invention to provide such a combined gas and steam-turbine power generating station wherein heat released at different points thereof is even more efficiently utilized for increasing the overall efficiency thereof.

With the foregoing and other objects in view, theres is provided, in accordance with the invention, a combined gas and steam-turbine power generating station having a gas-turbine unit and a steam turbine unit, the gas-turbine unit having a gas turbine with a combustion chamber, a coal gasifier preceding the gas turbine unit, a heat exchanger plant including a raw gas/pure gas heat exchanger following the coal gasifier, a gas purifier following the heat exchanger plant, a pure-gas line leading from the gas purifier to the combustion chamber of the gas turbine, an air decomposition plant with a molecular sieve regeneration circuit preceding the coal gasifier and having an oxygen line feeding the coal gasifier and a nitrogen line leading to the combustion chamber of the gas turbine, and a nitrogen compressor connected in the nitrogen line, includes at least one air compressor preceding the air decomposition plant and the combustion chamber of the gas turbine, and an air line connecting the air compressor to an input of the air decomposition plant, the air line being split into two parallel branches, one of the branches including therein a heat exchanger connected into the molecular sieve regeneration circuit of the air decomposition plant and the other of the branches including therein a nitrogen/air heat exchanger leading to the combustion chamber of the gas turbine.

In accordance with another feature of the invention, the nitrogen line terminates behind the nitrogen/air heat exchanger in the pure-gas line behind the raw gas/pure gas heat exchanger.

In accordance with a further feature of the invention, at least one further heat exchanger for generating process heat is connected in the other of the branches of the air line which includes the nitrogen/air heat exchanger.

In accordance with an additional feature of the invention, a further heat exchanger for coupling out distant heat is connected in the other of said branches of the air line which includes the nitrogen/air heat exchanger.

In accordance with an added feature of the invention, a final air cooler is connected in the other branch of the air line including the nitrogen/air heat exchanger, at a location directly ahead of the air decomposition plant.

In accordance with yet another feature of the invention, there are provided, in accordance with the invention, means for feeding heat released in the further heat exchanger to an evaporator of a plant for evaporating chloride-containing waste water of a waste-water treatment plant.

In accordance with yet a further feature of the invention, there are provided, in accordance with the invention, means for feeding additional heat in the form of low-pressure steam from a low-pressure steam generator to the evaporator.

In accordance with yet an additional feature of the invention, there are provided, in accordance with the invention, means for feeding additional heat in the form of low-pressure steam from a sulfur production plant of the gas purifiers to the evaporator.

In accordance with still another feature of the invention, there are provide, in accordance with the invention, means for evaporating the chloride-containing waste water in a vacuum.

In accordance with still a further feature of the invention, the evaporating means includes a multi-stage evaporator plant wherein heat fed thereto by the further heat exchanger is fed to a first evaporator stage.

In accordance with still an additional feature of the invention, the gas purifier includes a desulfurization plant, and including means for feeding at least part of the heat released in the heat exchanger of the other branch of the air line, except for the nitrogen/air heat exchanger, to a reboiler of a regeneration column of the desulfurization plant.

In accordance with a concomitant feature of the invention, the gas purifier includes a hydrogen sulfide absorption plant, and including means for regenerating scrubbing medium of the hydrogen sulfide absorption plant in a vacuum. Other features which are considered as characteristic for the invention are set forth in the appended claims.

Dividing the air line connecting the air compressor to the input of the air decomposition system into two parallel branches ensures the possibility of using the excess heat of the compressed air which flows to the air decomposition system at the temperature level at which it is produced, on the one hand, for regenerating the molecular sieves of the air decomposition system and, on the other hand, for further heating the nitrogen which flow from the air decomposition system and is already preheated by the compression in the nitrogen compressor to the temperature level of the pure gas leaving the raw gas/pure gas heat exchanger. The fuel gas temperature can thereby be increased further before entering the combustion chamber of the gas turbine without requiring excessive heating of the pure gas in the raw gas/pure gas heat exchanger plant.

In thus heating up the fuel gas flowing to the combustion chamber of the gas turbine, it is particularly advantageous, in accordance with a feature of the invention, to have the nitrogen line terminate behind the nitrogen/air heat exchanger in the pure gas line behind the raw gas/pure gas heat exchanger. The advantage resulting therefrom is that the nitrogen can be heated up there at a lower temperature level than if it had already been mixed with the hot raw gas beforehand.

In accordance with another feature of the invention, there is provided a further heat exchanger for generating process heat in the branch of the air line containing the nitrogen/air heat exchanger. This opens up the possibility of utilizing the heat remaining in the compressor air after it has passed through the nitrogen/air heat exchanger in the power generating station, and thereby improving the net efficiency of the power generation station further.

Although the invention is illustrated and described herein as embodied in combined gas and steam-turbine power generating station, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing, in which the single FIGURE is a schematic and diagrammatic view of individual components of the gas and steam-turbine power generating station according to the invention.

Referring now to the FIGURE of the drawing, there is shown therein a combined gas and steam-turbine power generating station 1 formed mainly of a gas-turbine power generating station unit 2 and of a steam-turbine power generating unit 3, a coal gasifier 4 preceding the gas-turbine power generating station unit 2 with an air decomposition or dissociation plant 5 preceding the coal gasifier 4, a heat exchanger plant 6 following the coal gasifier 4 at the raw-gas or crude-gas side thereof, and a gas purifier 7 which follows the heat exchanger plant 6 at the raw-gas or crude-gas side thereof. The heat exchanger plant 6 includes a high-pressure steam generator 8, a raw gas/pure gas heat exchanger 9 and a low-pressure steam generator 10. The gas purifier 7 following the heat exchanger plant 6 at the raw-gas side thereof includes, in the illustrated embodiment, a raw-gas scrubber 11, a hydrogen sulfide absorption plant 12, a sulfur production plant 13 and a waste water treatment plant 54 with an evaporator 53 for evaporating the waste water. The gas-turbine power generator station unit 2 contains a gas turbine 14 as well as an air compressor 15 and a generator 16 driven by the gas turbine 14.

To the air compressor 15, there is connected an air line 18 which leads to a combustion chamber 17 of the gas turbine 14 as well as to the air decomposition plant 5. To this air line 18, there is connected, in parallel with the air compressor 15 driven by the gas turbine 14, a further, separately driven air compressor 19 which can be switched on as required. The air line 18 is divided into two branches 20 and 21 between the two air compressors 15 and 19, on the one hand, and the air decomposition plant, on the other hand. The one branch 20 thus leads from the air line 18 via a heat exchanger 23 connected into a molecular-sieve regenerating circuit 22 of the air decomposition plant 5 to the latter. The other branch 21 leads via a nitrogen/air heat exchanger 26 inserted into nitrogen line 25 behind a nitrogen compressor 24, a further heat exchanger 27 for generating process heat, another heat exchanger 28 for generating process heat and/or for coupling-out "distant heat" as well as a final cooler 29 to the input of the air decomposition plant 5. A pure gas line 30 leaving the gas purifier 7 leads via the raw gas/pure gas heat exchanger 9 of the heat exchanger plant 6 directly into the combustion chamber 17 of the gas turbine 14. The nitrogen line 25 leaving the nitrogen/air heat exchanger 26 terminates in this pure gas line 30 before the latter enters the combustion chamber 17.

An exhaust gas line 31 of the gas turbine 14 leads through a waste-heat steam generator plant 32 and, after passing therethrough, terminates in a flue 33. The waste-heat steam generator plant 32 includes, arranged serially i.e. one behind the other, in the flow direction of the exhaust gas, a high-pressure steam generator 34, a feedwater heating surface 35 and a low-pressure steam generator 36. A steam turbine 37 of the steam-turbine power generating station unit 3 drives a generator 38 and, on the waste-steam side of the turbine 37, is connected to a condenser 39. The condenser 39 is connected in turn to a feedwater tank 41 via a condensate pump 40. Via feedwater pumps 42, 43, 44 connected to the feedwater tank 41, the various feedwater heating surfaces and steam-generating heating surfaces of the waste heat steam generator plant 32 and the heat exchanger plant 6 following the coal gasifier 4 are supplied. Superheater heating surfaces in the heat exchanger plant 6 following the coal gasifier 4 and the steam generator 34 located in the waste heat steam generator plant 32 are connected at the output thereof, in accordance with their pressure level, to corresponding inlet stubs or unions 45 and 46 of the steam turbine 37.

In the operation of this combined gas and steam-turbine power generating station 1, air is pumped into the combustion chamber 17 and into the air line 18 by the air compressor 15 mounted on the shaft of the gas turbine 14. This air then divides into the two branches 20 and 21 of the air line 18 and flows in the one branch through the heat exchanger 23 connected in the molecular-sieve regeneration circuit 22 of the air decomposition plant 5, and in the other branch 21 successively through the nitrogen/air heat exchanger 26, a heat exchanger 27 for generating process heat, a further heat exchanger 28 for coupling-out "distant" heat and an end cooler 29 before this branch 21 of the air line 18 is united with the other branch 20 and leads to the air decomposition plant 5. In the air decomposition plant 5, the air is split or decomposed or disassociated, utilizing the the different boiling points of the nitrogen and the oxygen. In the process, carbon dioxide and water are absorbed on mulecular sieves, generally zeolyte or aluminosilicate, before the air is cooled to low temperatures, and are therefore separated from the air. These molecular sieves are cyclically switched or changed over and the loaded or laden molecular sieve is switched into the molecular-sieve regeneration circuit 22 in order to drive out the adsorbed substances by heating them up. A partial flow of the nitrogen separated in the air decomposition plant 5 is used as the regeneration gas. The oxygen recovered in the air decomposition plant 5 is conducted, via the oxygen compressor 48 inserted into the oxygen line 47, into the coal gasifier 4 operated at overpressure. To this coal gasifier 4, there is fed finely milled coal via a coal feed line 49 in a conventional, nonillustrated manner. The ash which is formed is discharged via an ash discharge line 50. The raw gas produced in the coal gasifier 4 gives off its heat, in the heat exchanger plant 6 post-connected on the gas side to the coal gasifier 4 to the high-pressure and the low-pressure steam generators built therein, and thereby to the steam for the steam turbine 37, and to the raw gas/pure gas heat exchanger 9, and thereby to the pure gas flowing out of the gas purifier 7, before the heat of the raw gas is delivered to the gas purifier 7 per se. In the raw-gas scrubber 11 of the gas purifier 7, dust and halogens are first washed out and, in the following sulfur absorption plant 12, the sulfur compounds as well as further residual gases are separated. In the connected sulfur production plant 13, the sulfur compounds are converted into elementary sulfur. The liquid wastes produced in the raw-gas scrubber 11 and the sulfur absorption plant 13 are processes in the waste water treatment plant 54. In the case of chloride-containing coals, waste water rich in chlorides is formed. In order to reduce the salt content or fraction of the waters, the preconcentrated chloride-containing waste water is concentrated. The chloride produced can then be disposed of as salt.

The pure gas which leaves the gas purifier 7 at about 20° to 80° C., depending upon the process used, is heated up again in the raw gas/pure gas heat exchanger 9 and fed to the combustion chamber 17 of the gas turbine 14 via the pure-gas line 301 Nitrogen is fed to this pure gas directly ahead of the combustion chamber 17 of the gas turbine 14. After this nitrogen leaves the air decomposition plant 5, it is compressed in the nitrogen compressor 24 to the pressure level in the pure-gas line 30 directly ahead of the combustion chamber 17 of the gas turbine 14 and heated in the process to about 90° to 200° C. Then, it is heated further in the nitrogen/air heat exchanger 26 to the temperature level of the pure gas flowing from the raw gas/pure gas heat exchanger 9. The thus-formed fuel gas which is hot but reduced as to its caloric value flows into the combustion chamber 17, is consumed there and fed to the gas turbine 14. The exhaust gas of the gas turbine 14 is conducted via the exhaust gas line 31 into the waste-heat steam generator 32 and surrenders its heat to the feedwater or the steam, respectively, in the high-pressure steam generator 34, the feedwater heating surface 35 and the low pressure steam generator 36. After having been cooled down to 100° to 180° C., the exhaust gas is conducted into the flue 33.

It is a particular advantage of this power generating station that the excess heat of the compressor air is used not only for heating the nitrogen flowing to the combustion chamber 17 but also to make available the heat required for the molecular-sieve regenerating circuit 22 and the process heat of further consumers within the power generating plant. The hot compressed air flowing to the air decomposition plant 5 can be utilized yet further for generating internal process heat, although at a lower temperature level, after it has passed through the nitrogen/air heat exchanger 26. Thus, the heat exchanger 27 post-connected to the nitrogen/air heat exchanger 26 can serve for evaporating preconcentrated chlorine-containing waste water of the gas purifier 7. Of the technically known methods for waste water evaporation, multi-staged evaporation under vacuum seems to be particularly suitable for this purpose because the utilization of a large part of the tangible heat of the air for evaporation is achieved by the thus attainable lowering of the evaporation temperature. Determining the number of stages depends upon technical economic aspects. For reasons of energy consumption, more than one stage is necessary as a rule. If the energy requirement for evaporation cannot be covered or accommodated completely from the heat taken up in the heat exchanger, heating steam additionally generated in the power generating plant can be fed to the evaporation plant. For this purpose, in particular, part of the steam generated in the sulfur production plant or low-pressure steam taken from the steam-turbine power generation station unit 3 can be used. The heat fed to the hydrogen sulfide absorption plant 12 by the heat exchanger 51, which is to cover especially the heat required for regenerating the loaded scrubber medium, can be covered from part of the heat removed in the heat exchangers 27 or 28. Coupling-in the heat from the heat exchanger 28 is suited particularly for regenerating the scrubbing medium under vacuum because of the low temperature level.

There is claimed:

1. A combined gas and steam-turbine power generating station having a gas-turbine unit and a steam turbine unit, the gas-turbine unit having a gas turbine with a combustion chamber, a coal gasifier preceding the gas turbine unit, a heat exchanger plant including a raw gas/pure gas heat exchanger following the coal gasifier, a gas purifier following the heat exchanger plant, a pure-gas line leading from the gas purifier to the combustion chamber of the gas turbine, an air decomposition plant with a molecular sieve regeneration circuit preceding the coal gasifier and having an oxygen line feeding the coal gasifier and a nitrogen line leading to the combustion chamber of the gas turbine, and a nitrogen compressor connected in the nitrogen line, comprising at least one air compressor preceding the air decomposition plant and the combustion chamber of the gas turbine, and an air line connecting said air compressor to an input of the air decomposition plant, said air line being divided into two parallel branches, one of said branches including therein a heat exchanger connected into the molecular sieve regeneration circuit of the air decomposition plant and the other of said branches including therein a nitrogen/air heat exchanger leading to the combustion chamber of the gas turbine.

2. A combined gas and steam-turbine power generating station according to claim 1, wherein said nitrogen line terminates behind the nitrogen/air heat exchanger in the pure-gas line behind the raw gas/pure gas heat exchanger.

3. A combined gas and steam-turbine power generating station according to claim 1, wherein at least one further heat exchanger for generating process heat is connected in said other of said branches of the air line which includes the nitrogen/air heat exchanger.

4. A combined gas and steam-turbine power generating station according to claim 1, wherein a further heat exchanger for coupling out distant heat is connected in said other of said branches of the air line which includes the nitrogen/air heat exchanger.

5. A combined gas and steam-turbine power generating station according to claim 1, wherein a final air cooler is connected in said other branch of the air line including the nitrogen/air heat exchanger, at a location directly ahead of the air decomposition plant.

6. A combined gas and steam-turbine power generating station according to claim 3, including means for feeding heat released in said further heat exchanger to an evaporator of a plant for evaporating chloride-containing waste water of a waste-water treatment plant.

7. A combined gas and steam-turbine power generating station according to claim 6, including means for feeding additional heat in the form of low-pressure steam from a low-pressure steam generator to said evaporator.

8. A combined gas and steam-turbine power generating station according to claim 6, including means for feeding additional heat in the form of low-pressure steam from a sulfur production plant of the gas purifier to said evaporator.

9. A combined gas and steam-turbine power generating station according to claim 6, including means for evaporating the chloride-containing waste water in a vacuum.

10. A combined gas and steam-turbine power generating station according to claim 9, wherein said evaporating means comprise a multi-stage evaporator plant wherein heat fed thereto by said further heat exchanger is fed to a first evaporator stage.

11. A combined gas and steam-turbine power generating station according to claim 3, wherein the gas purifier includes a desulfurization plant, and including means for feeding at least part of the heat released in the heat exchanger of said other branch of the air line, except for the nitrogen/air heat exchanger, to a reboiler of a regeneration column of said desulfurization plant.

12. A combined gas and steam-turbine power generating station according to claim 11, wherein the gas purifier includes a hydrogen sulfide absorption plant, and including means for regenerating scrubbing medium of said hydrogen sulfide absorption plant in a vacuum.

* * * * *